United States Patent
Kazemi et al.

(10) Patent No.: US 9,571,970 B2
(45) Date of Patent: Feb. 14, 2017

(54) EVALUATING LOCATION BASED ON MULTIPLE DATA SOURCES

(71) Applicant: Apple Inc., Cupertino, CA (US)

(72) Inventors: Pejman Lotfali Kazemi, Sunnyvale, CA (US); Glenn Donald MacGougan, San Jose, CA (US); Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,799

(22) Filed: May 30, 2014

(65) Prior Publication Data
US 2015/0350833 A1     Dec. 3, 2015

(51) Int. Cl.
*H04W 64/00*   (2009.01)
*H04W 4/02*    (2009.01)

(52) U.S. Cl.
CPC ............. *H04W 4/023* (2013.01); *H04W 4/028* (2013.01)

(58) Field of Classification Search
CPC ..................................................... H04W 64/00
See application file for complete search history.

(56) References Cited

U.S. PATENT DOCUMENTS

| | | | |
|---|---|---|---|
| 2011/0124317 A1* | 5/2011 | Joo | H04L 63/18 455/411 |
| 2014/0162692 A1* | 6/2014 | Li | H04L 67/40 455/456.3 |
| 2014/0278077 A1* | 9/2014 | Levin | G01S 19/05 701/469 |

* cited by examiner

*Primary Examiner* — Michael T Vu
(74) *Attorney, Agent, or Firm* — Fish & Richardson P.C.

(57) ABSTRACT

Among other things, we describe a method that includes, on an electronic device, receiving, from a first location system of the electronic device, first data indicative of a first location of the device at a first time, comparing the first data to second data indicative of a second location of the device at a second time, the second data having been received from a second location system of the electronic device, and based on the comparison, determining whether the first data meets a threshold of location data integrity.

41 Claims, 6 Drawing Sheets

US 9,571,970 B2

EVALUATING LOCATION BASED ON MULTIPLE DATA SOURCES

TECHNICAL FIELD

The disclosure generally relates to evaluating location based on multiple sources of data such as location systems.

BACKGROUND

A mobile device can include one or more location-based applications that are configured to perform location-specific tasks. For example, location applications can indicate location information to a user of the device such as where she is, where she has been, what direction she is traveling, how fast she is traveling, and other location information. Location information can be determined based on one or more location systems.

SUMMARY

In one aspect, in general, a method includes, on an electronic device, receiving, from a first location system of the electronic device, first data indicative of a first location of the device at a first time, comparing the first data to second data indicative of a second location of the device at a second time, the second data having been received from a second location system of the electronic device, and based on the comparison, determining whether the first data meets a threshold of location data integrity. This aspect can also include corresponding systems, apparatus, and computer program products stored on a storage device.

Implementations may include one or more of the following features. Comparing includes determining a difference between a location value of the first data and a location value of the second data, and where determining whether the first data meets a threshold of location data integrity includes determining whether the difference meets a threshold expected deviation. The expected deviation is determined based on a classification of activity engaged in by a user of the device. The expected deviation is determined based on a maximum speed value associated with the activity engaged in by the user of the device. The expected deviation is determined based on a current expected uncertainty metric provided by the first location system. The method includes receiving the second data from a buffer containing recently determined location information received from location systems of the electronic device. The first location data includes latitude, longitude, a timestamp, and an uncertainty metric. Determining whether the first data meets a threshold of location data integrity includes determining whether the first data indicates that, between the first time and the second time, the device has traveled an expected distance. The expected distance is determined based on a classification of activity engaged in by the user of the device. The method includes discarding the first data if the first data is determined to not meet the threshold of location data integrity. The method includes adjusting an uncertainty metric associated with the first data if the first data is determined to not meet the threshold of location data integrity.

Particular implementations provide at least the following advantages. Location data can be evaluated for integrity and an action can be taken to account for unreliable location data.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
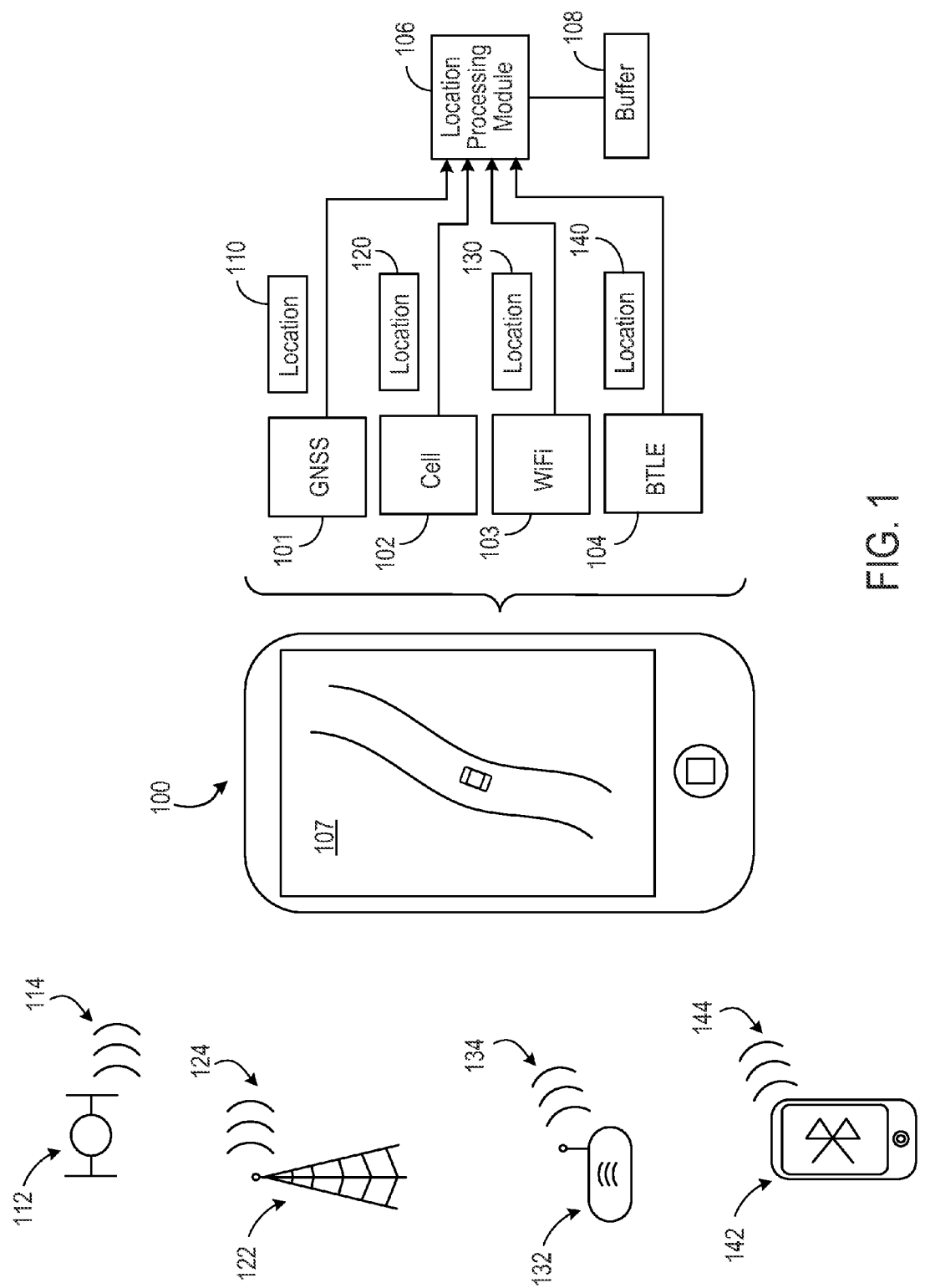
FIG. 1 is a block diagram of a mobile device and related components.

Some mobile devices, such as smartphones, have one or more location systems which provide information describing a current location of the device. Location applications running on a device can provide this information to a user of the device. The information may include where she is, where she has been, what direction she is traveling, how fast she is traveling, and other location information.

The device may calculate a current location based on data received from multiple location systems. The location systems available to device may include 1) a global navigation satellite system (GNSS) receiver, such as a Global Positioning System (GPS) receiver, 2) a cellular network-based positioning system, 3) a wireless network (WiFi) positioning system, 4) a short-range (e.g., Bluetooth) positioning system, and other kinds of location systems. The accuracy, precision, and energy requirements of each of these systems may vary depending on the current conditions of the device (e.g., whether the device is indoors or outdoors, the proximity of the device to facilities such as cellular network towers, and so on). Thus, the device may be able to determine its current location to a greater degree of accuracy and precision in a variety of environments by evaluating data from multiple systems. However, at any given time, some of these systems may provide location information that is not accurate or precise enough to be useful in determining the device's location. Further, some location systems may determine location based on data that could be tampered with or "spoofed," and so those location systems may be unreliable unless the integrity of the location data is evaluated.

In general, integrity of location data refers to the degree to which the location data is accurate and the degree to which precision of the location data is correctly estimated. The device can include functionality that evaluates the integrity (e.g., accuracy and precision) of location data received from each location system by comparing the data received from one system against the data recently received from one or more of the other systems. In some examples, if one system reports a location that is very different from the location that another system reported very recently, then one of the location systems may not be reporting useful location data and the most recent data point can be discarded. For example, if one location system indicates that the location of the device is at a first location, and five seconds later a second location system indicates that the device is a mile from the first location, one of the two locations is probably incorrect. Further, the device may have an activity classifier system that indicates whether the device is being carried by a user who is walking, driving, etc. The device can use this information to determine whether the deviation (e.g., distance) between two location values indicates a reasonable travel distance, or, in contrast, indicates likely bad data received from one of the two systems.

The determination of which of the two data points to discard can be based on rules defined for the location systems. For example, one of the location systems (e.g., a GPS system) may be designated as more reliable than another location system (e.g, a Bluetooth location system), and so the location data received from the less reliable system may be discarded. As another example, the location data received from one of the location systems may include an uncertainty metric calculated by the location system, where the uncertainly metric indicates an estimation of the precision of the location data which it is currently reporting. If the uncertainty metric of data received from one system indicates more uncertainly than the uncertainty metric of data received from another system, then the data received from the system indicating greater uncertainty may be discarded as too imprecise. In this way, the device can evaluate the integrity of the location data received from multiple location systems by comparing the data received from the location systems.

FIG. 1 shows an example of a mobile device 100 (e.g., a wireless mobile device) that runs location-aware applications. Location information used by a location application can be received from one or more location modules 101-104 that each determine a physical location of the mobile device 100, e.g., expressed as longitude and latitude. Each of the location modules 101-104 may include one or more physical components, such as an antenna and/or digital logic, and may also include executable code which, when executed, processes signals received by the physical components and provides data representing the signals to other components of the mobile device 100. In general, any module of the mobile device 100 may include physical components such as hardware, executable components such as software, or both. Data derived from the location information can then be displayed on a user interface 107 of the mobile device 100.

The location modules 101-104 may include a global navigation satellite system (GNSS) module 101, a cellular network-based location module 102, a wireless network (WiFi) location module 103, a Bluetooth Low-Energy short-range location module 104, as well as other kinds of location modules.

In some examples, the GNSS module 101 determines a physical location of the mobile device by receiving data from satellites 112 orbiting the earth and calculating a location based on the received data. For example, the satellites 112 can transmit signals 114 that carry data such as timing data. The signals 114 are received and interpreted by the GNSS module 110 to determine GNSS location data 110.

The integrity (e.g., accuracy and precision) of the location information depends on the number of signals 114 received by the GNSS module 101 as well as the signal strength of each signal 114. When the GNSS module 101 calculates the location data 110, the GNSS module 101 performs mathematical calculations using data carried by each signal 114. If a particular signal 114 is weak (e.g., the signal 114 as received by the GNSS module has too low of a signal-to-noise ratio), then the GNSS module 101 may not be able to interpret the signal 114. The combination of the strength of signals received by the mobile device, and the total number of the signals received, is sometimes referred to as signal quality. Generally, signal quality is higher when more signals are received, or the strength of the signals is higher, or both. The ability of the device 100 to determine a precise and/or accurate location may improve as the number of satellites providing sufficiently strong signals increases.

In some examples, the cellular network location module 102 determines a physical location of the mobile device by receiving data from cellular towers 122 on the surface of earth and calculating a location based on the received data. For example, the cellular towers 122 can transmit signals 124 that carry data such as location data. The signals 124 are received and interpreted by the cellular network location module 102 to determine cellular location data 120.

In some examples, the wireless network location module 103 determines a physical location of the mobile device by receiving data from wireless network routers 132 (e.g., located in buildings, outside of buildings, etc.) and calculating a location based on the received data. For example, the wireless network routers 132 can transmit signals 134 that carry data such as data identifying the individual router. The signals 134 are received and interpreted by the wireless network location module 103 to determine wireless network location data 130. In some implementations, the wireless network location module 103 access data describing known location of wireless routers and determines the wireless network location data 130 based on a known location of the wireless network router 132.

In some examples, the short-range location module 104 determines a physical location of the mobile device by receiving data from short-range network devices 142 and calculating a location based on the received data. In some examples, the short-range network devices 142 may be devices that support the Bluetooth Low Energy protocol, e.g., devices such as other mobile devices. For example, the short-range network devices 142 can transmit signals 144 that carry data such as data specifying the location of the short-range network device 142. The signals 144 are received and interpreted by the short-range location module 104 to determine short-range network location data 140. In some implementations, the wireless network location module 103 determines the short-range network location data 140 based on the data specifying the location of the short-range network device 142 and based on calculating a distance between the short-range network device 142 and the mobile device 100.

The location data 110, 120, 130, 140 is received by a location processing module 106. The location processing module 106 is a module of the mobile device 100 that determines a current location of the mobile device 100 based on the received location data. For example, the location processing module can store the location data 110, 120, 130, 140 in a buffer 108 of recent location data. A buffer is any module that stores data, e.g., a memory. In some examples, the most recent element of location data stored in the buffer 108 may be used as the current location of the mobile device 100. In some examples, a combination of the most recent elements of location data (e.g., a location derived from the ten most recently stored elements of location data) stored in the buffer 108 may be used as the current location of the mobile device 100. However, at any given time, some of the location modules 101-104 may provide more reliable location information than some of the other location modules 101-104. Reliable location information is information that has a high likelihood of being accurate and/or precise. For this reason, the most recently determined location data 110, 120, 130, 140 is evaluated before it is stored in the buffer 108. For example, the most recently determined location data 110, 120, 130, 140 can be compared to other location data already stored in the buffer 108 to evaluate the integrity of the most recently determined location data 110, 120, 130, 140.

Figure 2A:
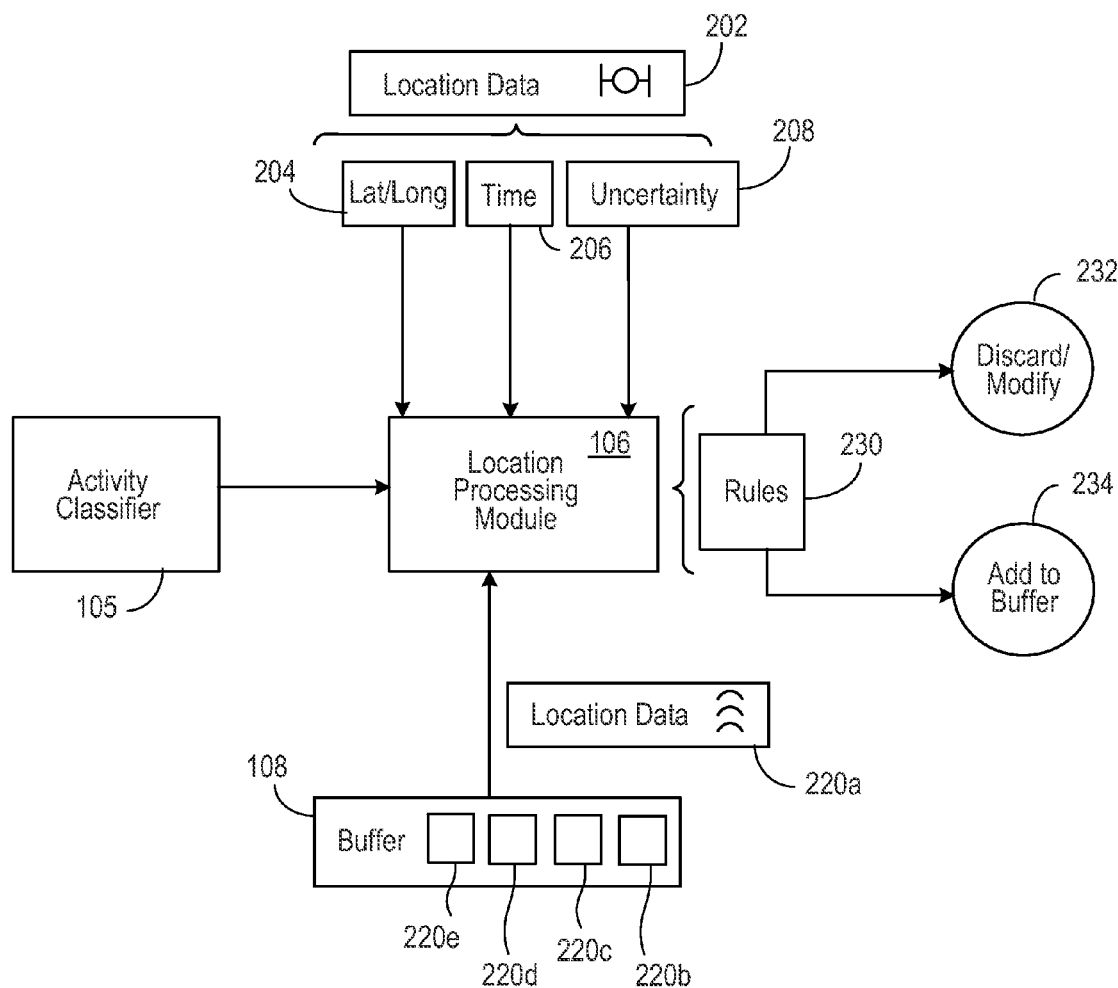
FIGS. 2A and 2B show components and modules of the mobile device.

FIG. 2A shows the mobile device 100 and associated components. The location processing module 106 of the mobile device receives location data 202 from one of the location modules 101-104 shown in FIG. 1. For example, the location data 202 shown here was received from the GNSS location module 101 shown in FIG. 1. The location data 202 includes several types of data, including latitude/longitude data 204, a timestamp 206, and an uncertainty metric 208. This data can be compared against different types of data already stored by the mobile device 100 even if the data came from other types of location systems.

The latitude/longitude data 204 specifies a current location of the mobile device 100 represented by the location data 202. The current location is specified in latitude, which is a value that represents a north-south position of a point on the earth's surface, and longitude, which is a value that represents an east-west position of a point on the earth's surface. In some implementations the latitude/longitude data 204 includes elevation, which is a value that represents a point above or below a mathematical representation of sea level of the earth.

The timestamp 206 specifies a time at which the location data 202 was calculated. For example, the timestamp 206 would be specified as a time of day, such as an hour, minute, second, etc., or the timestamp 206 could be specified as a number of seconds that have passed since a reference time (e.g., number of seconds since 0:00 Jan. 1, 1970), or could be specified as another value.

The uncertainty metric 208 specifies a value that represents the uncertainty of the latitude/longitude data 204. The uncertainty of a value indicates the degree to which the value could be inaccurate. In some examples, the uncertainty metric 208 could specify a margin of error for the latitude/longitude data 204. For example, the uncertainty metric 208 may specify that the latitude/longitude data 204 may be inaccurate by five meters. In this example, the latitude/longitude data 204 may specify an inaccurate location of the mobile device 100 at the time indicate by the timestamp 206. Instead, the actual location may have been anywhere within a range defined by a five meter radius and using the point specified by the latitude/longitude data 204 as the origin of the five meter radius. In some implementations, the uncertainty metric 208 is determined by the corresponding location module of the mobile device 100. In the example shown in FIG. 2, the location data 202 is received from the GNSS location module 101 (FIG. 1), and so the uncertainty metric 208 of the location data 202 may be determined by the GNSS location module 101. In this example, the uncertainty metric 208 may be determined based on information available to the GNSS location module 101. For example, the GNSS location module may be configured to assign a value to the uncertainty metric 208 based on the number of satellite signals received by the GNSS location module 101. In this example, the uncertainty of the latitude/longitude determined by the GNSS location module 101 may decrease as more satellite signals are received at a given time. Thus, the GNSS location module 101 will assign a value indicative of greater uncertainty if few satellite signals are received at the time the location data 202 is determined, and the GNSS location module 101 will assign a value indicative of less uncertainty if more satellite signals are received at the time the location data 202 is determined. The other location modules 102-104 may have different techniques for determining a value for the uncertainty metric 208. For example, the cellular network location module 102 may determine a value for the uncertainty metric 208 based on a characteristic of signals received from cellular network towers. As another example, the wireless network location module 103 may determine a value for the uncertainty metric 208 based on a characteristic of signals received from wireless network routers. As another example, the short-range location module 104 may determine a value for the uncertainty metric 208 based on a characteristic of signals received from short-range network devices. In some implementations, a high uncertainty metric 208 is an uncertainty metric 208 having a value indicating high uncertainty, and a low uncertainty metric 208 is an uncertainty metric 208 having a value indicating low uncertainty. For example, the uncertainty metric 208 may have a value ranging from 1 to 10, with 1 indicating low uncertainty, and 10 indicating high uncertainty. Low uncertainty is desirable, and so low uncertainty is sometimes considered to be "good" uncertainty. Similarly, high uncertainty is undesirable, and so high uncertainty is sometimes considered to be "bad" uncertainty The location processing module 106 compares the most recently received location data 202 (including the latitude/longitude data 204, a timestamp 206, and an uncertainty metric 208) to location data 220a-e stored in the buffer 108. In some implementations, the location processing module 106 compares the received location data 202 to the N most recently stored elements of location data 220a-e, where N could be a value such as ten. Based on the results of the N comparisons, the location processing module 106 can evaluate the most recently received location data 202. For example, the location processing module 106 can determine an action to take based on the evaluation of the most recently received location data 202, as described below.

In some implementations, the location processing module 106 accesses one or more rules 230 to evaluate the most recently received location data 202. The rules 230 can be used to assess factors that are indicative of the integrity of an element of location data 202. The location processing module 106 can apply the rules 230 each time new location data 202 is received to determine an action to take, e.g., based on the integrity of the location data 202 as determined by application of the rules 230. For example, if the location data 202 is deemed to have sufficiently high integrity according to the rules 230 (e.g., the location data 202 meets a threshold of integrity), the location processing module 106 may take an action 234 such as adding the location data 202 to the buffer 108. As another example, if the location data 202 is deemed to not have sufficiently high integrity according to the rules 230 (e.g., the location data 202 meets a threshold of integrity), the location processing module 106 may take a different action 232 such as discarding the location data 202 or modifying the location data 202 before adding it to the buffer 108. The rules 230 can be defined according to many factors.

Figure 2B:
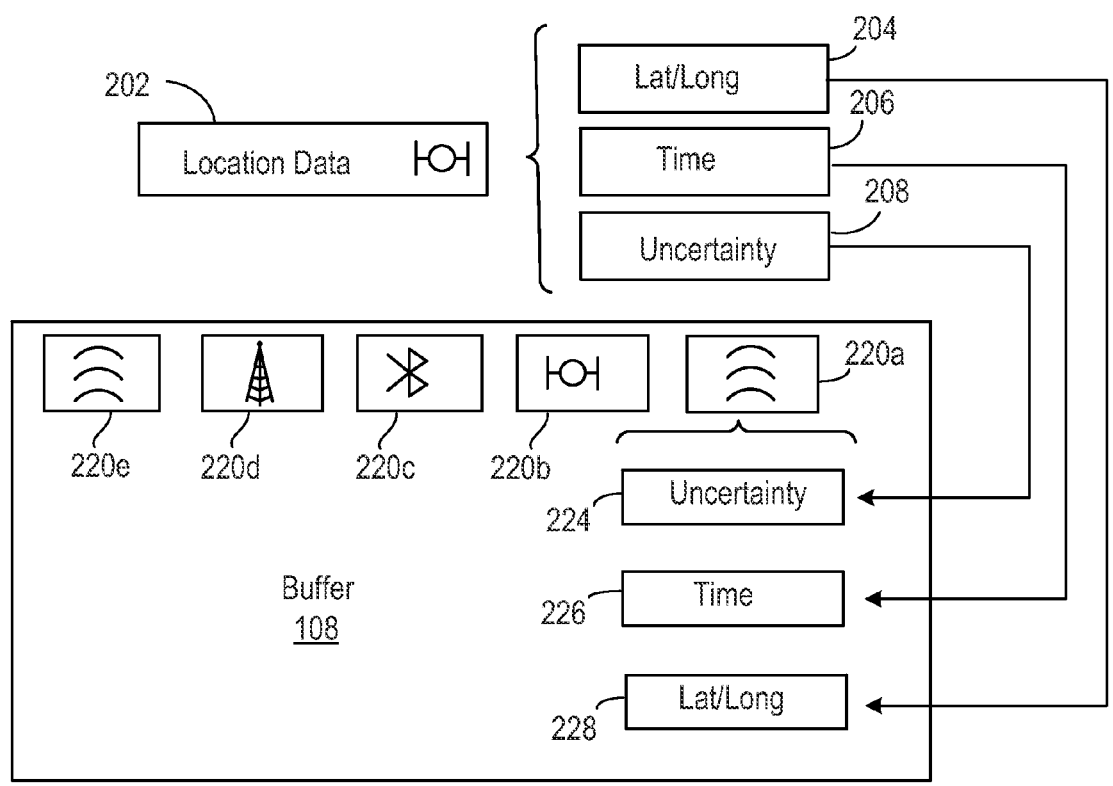

FIG. 2B shows the buffer 108 and associated data in detail. As shown in the figure, the buffer stores location data 220a, 220e provided by the wireless network location module 103, and stores location data 220b provided by the GNSS location module 101, and stores location data 220c provided by the short-range network location module 104, and stores location data 220d provided by the cellular network location module 102. The location data 202 received from the GNSS location module 101 can be compared with any of the elements of the location data 220a-e stored in the buffer in order to evaluate factors indicative of the integrity of an element of location data 202

One factor indicative of the integrity of an element of location data 202 is the uncertainty metric 208. For example, if the uncertainty metric 208 of the received location data 202 is higher than other elements of location data 220a-e stored in the buffer 108, the location data 202 may be unreliable compared to the other elements of location data 220a-e. The uncertainty metric 208 of the received location data 202 can be compared to the uncertainty metric 224 of other elements of location data 220a-e to determine whether the uncertainty of the received location data 202 is comparable to, significantly worse than, or significantly better than the other elements of location data 220a-e. Thus, the location data 202 may be discarded rather than stored in the buffer 108, for example, if the uncertainty metric 208 of the received location data 202 is significantly worse than one or more stored elements of location data 220a-e. If the uncertainty metric 208 of the received location data 202 is similar to or better than one or more stored elements of location data 220a-e, then the received location data 202 may be stored in the buffer 108.

Another factor indicative of the integrity of an element of location data 202 is the implied distance traveled between the timestamps associated with two pieces of location data. For example, if the location data 202 is associated with a timestamp 206 that indicates a time that is ten seconds later than the timestamp 226 associated with another element of location data 220a, then the location processing module 106 can compare the two locations (e.g., the latitude/longitude data 204, 228) represented by the elements of location data 202, 220a and determine if the distance traveled is reasonable, e.g., if the distance travel is within an expected deviation.

For example, if the latitude/longitude data 204 of the location data 202 indicates a location that is five hundred meters away from the location indicated by the latitude/longitude data 228 of the stored location data 220a that was captured ten seconds previously, then the location data 202 may not be reliable because five hundred meters is too far a distance for the mobile device 100 to have traveled in ten seconds. Thus, in some examples, the location data 202 may be discarded rather than stored in the buffer 108. As an alternative, in some examples, the uncertainty metric 208 of the location data 202 may be adjusted, e.g., adjusted to indicate an uncertainty of five hundred meters.

Alternatively, continuing with the same example, the location data 202 may in fact be reliable, but the location data 220a already stored in the buffer is unreliable. In some examples, the location processing module 106 may discard or modify location data 220a that is already stored in the buffer 108 rather than discard or modify recently received location data 202. For example, in some implementations, the location processing module 106 may deem certain types of location data to be more reliable than other types of location data. In the example shown in FIG. 2B, the recently received location data 202 is received from the GNSS location module 101 and may be compared against location data 220a received from the wireless network location module 103. The rules 230 may specify a reliability index associated with each type of location module. For example, the GNSS location module 101 may be assigned a reliability index having a value indicating high reliability, while the wireless network location module 103 may be assigned a reliability index having a value indicating low reliability. Thus, based on the reliability index, the location processing module 106 may store the location data 202 received from the GNSS location module 101 even if the speed of travel implied by the latitude/longitude data 204, 228 and the timestamps 206, 226 is exceeds an expected deviation from typical travel speeds.

The expected deviation between two locations indicated by two elements of location data 202, 220a may be determined in part based on a current activity of a user of the mobile device. As shown in FIG. 2A, the mobile device 100 has an activity classifier 105 which can make a determination as to what activity is being engaged in by the user. For example, the activity classifier 105 may receive information from one or more modules of the mobile device 100 such as accelerometers which provide information about the current conditions of the mobile device 100 with respect to motion. The information about the current conditions with respect to motion can be used to make an inference about the current activity of the user. As one example, in some implementations, the activity classifier 105 may make a determination that a user of a mobile device is driving an automobile if the information available to the activity classifier 105 indicates that the mobile device is moving between twenty and one hundred miles per hour and that a pattern of vibrations detected by an accelerometer is consistent with vehicular motion. As another example, in some implementations, the activity classifier 105 may make a determination that a user of a mobile device is jogging if the information available to the activity classifier 105 indicates that the mobile device is moving between five and ten miles per hour and that a pattern of vibrations detected by an accelerometer is consistent with jogging motion.

Using the example of location data 202 that indicates a time that is ten seconds later than another element of location data 220a, the location processing module 106 can compare the two locations represented by the elements of location data 202, 220a and determine if the distance traveled is within an expected deviation based on an activity indicated by the activity classifier 105. For example, if the distance traveled in the ten seconds is two hundred meters, and the current activity is vehicular travel, the distance traveled may be within an expected deviation because it is reasonable for a vehicle such as an automobile to have traveled two hundred meters in ten seconds. Alternatively, if the current activity is jogging, the distance traveled may not be within an expected deviation because it is not reasonable for a person to have jogged two hundred meters in ten seconds.

Figure 3:
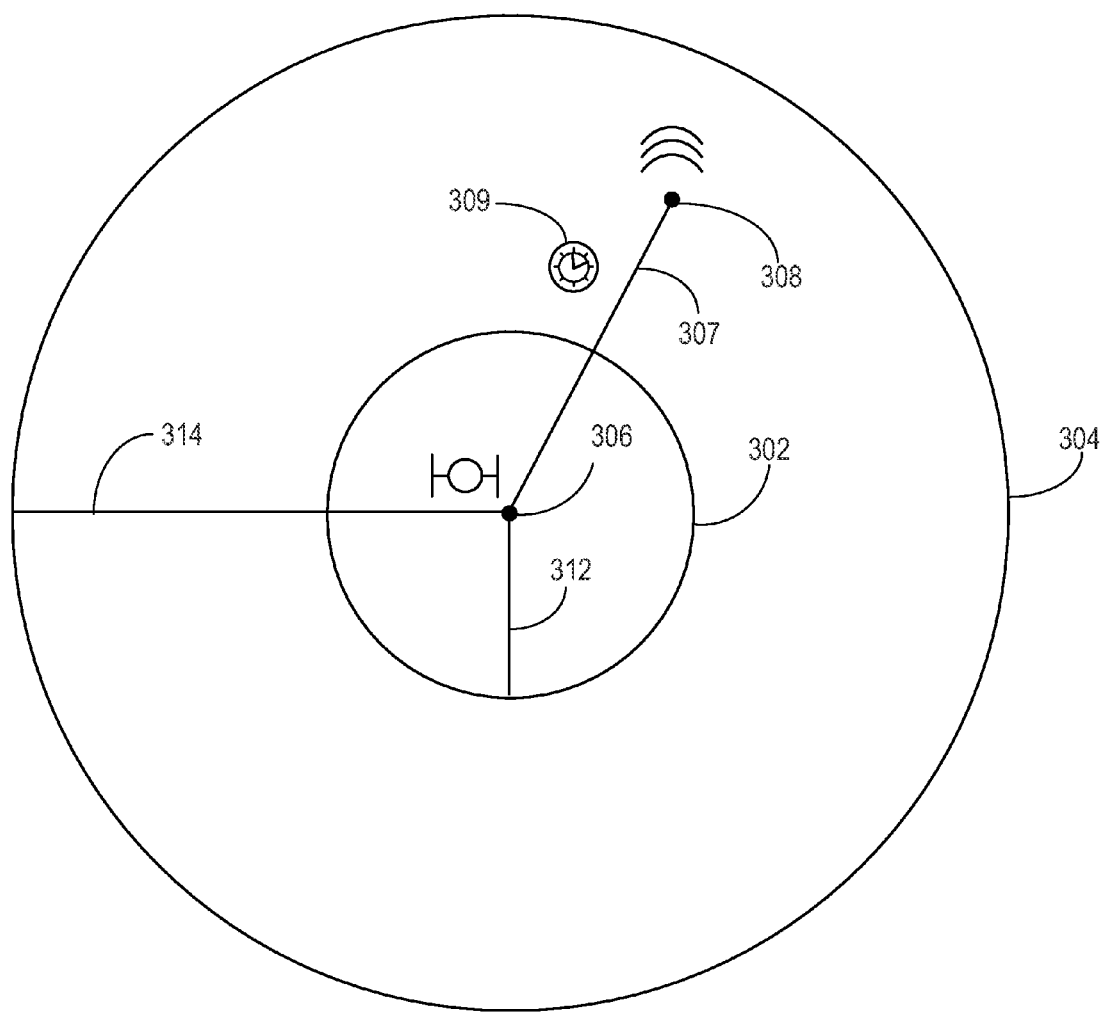
FIG. 3 represents an example technique for determining location data integrity based on an expected deviation between two locations.

FIG. 3 represents an example technique for determining location data integrity based on an expected deviation between two locations indicated by two elements of location data. One circle 302 represents a first distance defined by a first radius 312 emanating from a first location 306. Another circle 304 represents a second distance defined by a second radius 314 emanating from a first location 306. The first location 306 may be defined, for example, by the location data 202 received by the location processing module 106 shown in FIG. 2A. For example, the first location 306 may be defined by the latitude/longitude data 204 associated with the location data 202.

Each radius 312, 314 represents a distance that is equal to or greater than an expected maximum distance that the mobile device 100 (FIG. 1) could have traveled over the course of a particular time period. Here, the time period is defined based on a second instance of location data, e.g., location data 220a stored in the buffer 108 (FIGS. 2A-2B). In some implementations, the location processing module 106 uses the area defined by one of the circles 302, 304 to compare the recently received location data 202 with stored location data 220a. For example, the location processing module 106 can compare the location 306 defined by the latitude/longitude data 204 associated with the location data 202 with a location 308 defined by the latitude/longitude data 228 associated with the stored location data 220a. A circle 302, 304 used in this way is sometimes referred to as a horizontal protection limit.

In some implementations, the location processing module 106 calculates a radius 312, 314 representing the maximum distance that the mobile device 100 would have been expected to travel in a particular time period 309. In some examples, the time period 309 is derived from the amount of time that elapsed between the time represented by the timestamp 226 of the stored location data 220a and the timestamp 206 of the recently received location data 202. The location processing module 106 then determines if the distance 307 that the mobile device 100 traveled during the time period 309 meets an expected deviation.

In some implementations, the expected maximum distance traveled, e.g., the radius 312, 314, is a function of the activity engaged in by a user of the mobile device 100. For example, if the activity classifier 105 shown in FIG. 2A indicates that the user is walking, the location processing module 106 can choose a radius 312 that represents a value greater than maximum distance that a human could have walked in the time period 309. For example, a user who is walking typically would not exceed six miles per hour. If the time period 309 is ten seconds, then the radius 312 representing an expected deviation would be defined as at least 88 feet. In some implementations, the expected deviation can incorporate an additional margin. For example, the expected deviation (e.g., as defined by the radius 312) may be twice this distance, or 176 feet.

As another example, if the activity classifier 105 shown in FIG. 2A indicates that the user is jogging, the location processing module 106 can choose a radius 314 that represents a value greater than maximum distance that a human could have jogged in the time period 309. For example, a user who is jogging typically would not exceed twelve miles per hour. If the time period 309 is ten seconds, then the radius 312 representing an expected deviation would be defined as at least 176 feet. In some implementations, the expected deviation can incorporate an additional margin. For example, the expected deviation (e.g., as defined by the radius 314) may be twice this distance, or 352 feet.

The location processing module 106 can determine if the location 308 defined by stored location data 220a is within the area defined by the radius 312, 314 that corresponds to an expected deviation of the current activity. In the example shown in FIG. 3, the first radius 312 may correspond to the expected deviation in a scenario in which the user is walking, and the second radius 314 may correspond to the expected deviation in a scenario in which the user is jogging. If the activity classifier 105 (FIG. 2A) indicates that the user of the mobile device 100 is walking, then the location 308 defined by stored location data 220a is not within the area defined by the radius 312 and so the location processing module 106 may discard or modify the recently received location data 202 (or, in some situations, discard or modify the stored location data 220a). If the activity classifier 105 indicates that the user of the mobile device 100 is jogging, then the location 308 defined by stored location data 220a is within the area defined by the radius 314 and so the location processing module 106 may store the recently received location data 202 in the buffer 108.

In some implementations, the expected deviation (e.g., the radius 312, 314) depends on an uncertainty metric of the location data 202, 220a (FIGS. 2A-2B). For example, an uncertainly metric 208 associated with the recently received location data 202 may indicate that the latitude/longitude of the location data 202 may be inaccurate by 100 feet. As another example, the uncertainly metric 208 associated with the recently received location data 202 may indicate that the latitude/longitude of the location data 202 may have been determined at a precision of less than 100 feet. Thus, the distance 307 between the two locations 306, 308 shown in FIG. 3 may deviate from an expected distance traveled by at least an additional 100 feet. In this example, either radius 312, 314 can be increased by an additional 100 feet to account for this additional expected deviation. In this way, the expected deviation (e.g., the radius 312, 314) accounts for factors other than or in addition to distance traveled. If the latitude/longitude of the location data 202 still exceeds the expected deviation, the uncertainly metric 208 of the location data 202 may have been an inaccurate measure of precision, thus indicating that the integrity of the location data 202 may be low. In some implementations, the difference between the latitude/longitude of the location data and the expected deviation can be used to adjust the uncertainty metric 208 of the location data 202. For example, if the latitude/longitude of the location data 202 places the mobile device at a location 300 feet beyond the expected deviation, then the uncertainty metric 208 can be adjusted to indicate an estimated precision that is at least 300 feet lower than the previous estimated precision.

The comparison represented by FIG. 3 can be carried out by the location processing module 106 multiple times, e.g., by comparing any of the location data 220a-e stored in the buffer 108 to the recently received location data 202. For example, the location processing module 106 can compare the recently received location data 202 to location data 220a-e received from multiple types of location systems. If some comparisons demonstrate that the recently received location data 202 is within an expected deviation, and other comparisons demonstrate that the recently received location data 202 is not within an expected deviation, the rules 230 may indicate what action to take. For example, if a threshold number of comparisons (e.g. 50% of the comparisons) indicate that the recently received location data 202 is within an expected deviation, the location processing module 106 may store the location data 202 in the buffer.

Figure 4:
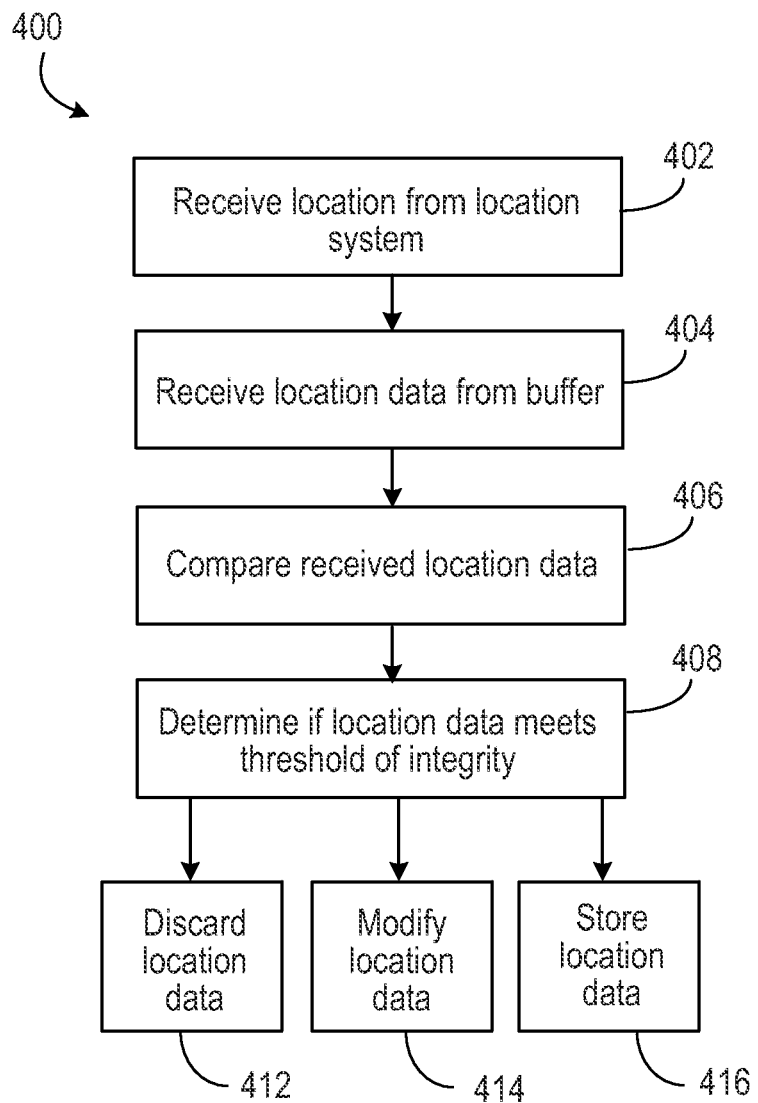
FIG. 4 is a flowchart of an exemplary process of evaluating location data integrity.

FIG. 4 is flow diagram of an exemplary process 400 for evaluating location data integrity on an electronic device. The process 400 can be performed, for example, by one or more modules of the mobile device 100 shown in FIG. 1. In some examples, the process 400 could be carried out by executing instructions stored on a non-transitory computer readable medium such as a computer readable storage device.

An element of location data is received from a location system of an electronic device (402). For example, the location data could be any of the types of location data 110, 120, 130, 140 shown in FIG. 1, and the location systems could be any of the location modules 101-104 shown in FIG. 1. The location data may include latitude/longitude, a timestamp, and an uncertainty metric An element of location data is received from a buffer of the electronic device (404). In some implementations, the electronic device stores the last N elements of location data received from any location system, e.g., the last ten elements of location data, in a buffer such as the buffer 108 shown in FIGS. 1-2B. The location data receiver from the buffer could be any of the stored location data 220a-e shown in FIGS. 2A-2B.

The two elements of location data are compared (406). For example, the comparison may include determining a difference between a location value of the first data and a location value of the second data, and where determining whether the first data meets a threshold of location data integrity includes determining whether the difference meets a threshold expected deviation. The expected deviation may be determined based on a classification of activity (e.g., on a maximum speed value associated with the activity) engaged in by the user of the device. An example of the comparison is shown in FIG. 3.

A determination is made of whether the location data received from the location system meets a threshold of integrity (408). In some implementations, one or more rules are applied to results of the comparison (406) to determine if the location data meets a threshold of integrity. For example, the rules could be the rules 230 shown in FIG. 2A. In some examples, the determination of whether the location data received from the location system meets a threshold of integrity includes determining whether the location data indicates that the device has traveled an expected distance (e.g, as determined by a classification of an activity engaged in by a user of the device).

Depending on the outcome of the determination, one or more actions can be taken. For example, the location data may be discarded (412), or may be modified (414), or may be stored in the buffer (416). For example, location data that does not meet the threshold of integrity may be discarded (412) or modified (414), and location data that meets the threshold of integrity may be stored in the buffer (416). In some implementations, modifying the location data may include adjusting an uncertainty metric of the location data. For example, if the location data is determined to be less precise than indicated by the uncertainty metric, then the uncertainty metric can be adjusted to indicate lower precision.

Figure 5:
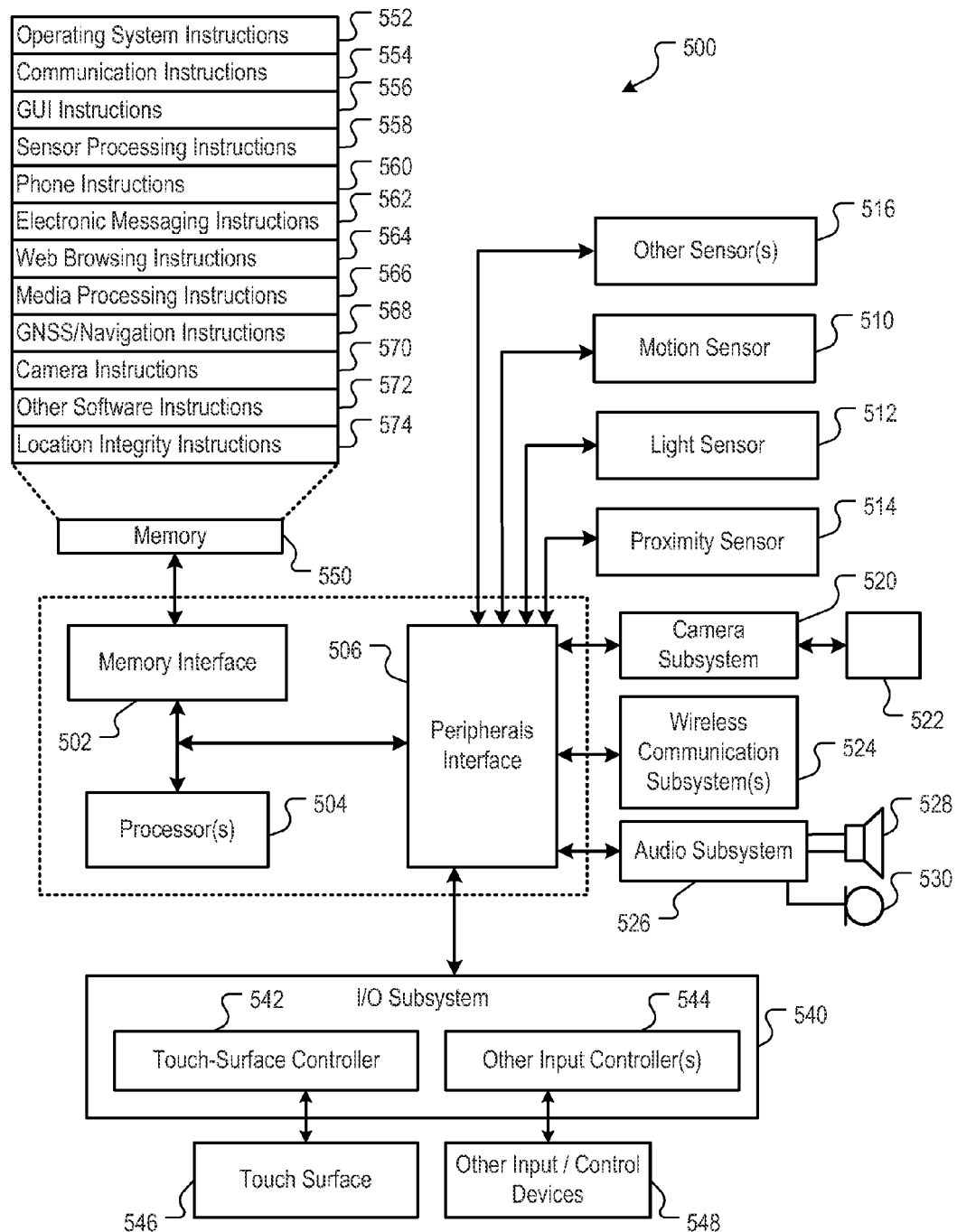
FIG. 5 is a block diagram of an exemplary system architecture implementing the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GNSS receiver), a temperature sensor, a biometric sensor, or other sensing device, to facilitate related functionalities. In some examples, the motion sensor 510 is an accelerometer. For example, the motion sensor 510 may detect acceleration of the computing device 500, speed of motion of the computing device 500, and other values indicative of the movement of the computing device 500.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 500 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication. In some implementations, audio recorded by the audio subsystem 526 is transmitted to an external resource for processing. For example, voice commands recorded by the audio subsystem 626 may be transmitted to a network resource such as a network server which performs voice recognition on the voice commands.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the security lockout and voice authentication features. Operating system 552 can implement the voiceprint and voice authentication features.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions, such as the process described in reference to FIG. 4; and/or camera instructions 570 to facilitate camera-related processes and functions.

The memory 550 can store other software instructions 572 to facilitate other processes and functions, such as the security and/or authentication processes and functions. For example, the software instructions can include instructions for performing voice authentication on a per application or per feature basis and for allowing a user to configure authentication requirements of each application or feature available on device 500.

In some implementations, the memory 550 stores location integrity instructions 574. For example, the location integrity instructions 574 can be used to evaluate the integrity of location data received from one or more location systems, e.g., by comparing location data received from one location system with stored location data originally received from another location system. An example of these techniques are shown in FIGS. 1-4. In some implementations, at least some of the location integrity instructions 574 can be carried out by the location processing module 106 shown in FIGS. 1 and 2B.

The memory 550 can also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
on an electronic device:
receiving, from a first location system of the electronic device, first data indicative of a first location of the device at a first time;
comparing the first data to second data indicative of a second location of the device at a second time, the second data having been received from a second location system of the electronic device, wherein comparing includes determining a difference between a value of the first data indicative of the first location and a value of the second data indicative of the second location;
based on the comparison, determining whether the first data meets a threshold of location data integrity, wherein determining whether the first data meets a threshold of location data integrity includes determining whether the difference meets a threshold expected deviation; and
in response to the determination whether the first data meets a threshold of location data integrity, determining whether to discard either of the first data or the second data, and determining whether to store either of the first data or the second data in a buffer of location data.

2. The method of claim 1 where the expected deviation is determined based on a classification of activity engaged in by a user of the device.

3. The method of claim 2 where the expected deviation is determined based on a maximum speed value associated with the activity engaged in by the user of the device.

4. The method of claim 1 where the expected deviation is determined based on a current expected uncertainty metric provided by the first location system.

5. The method of claim 1 comprising receiving the second data from a buffer containing recently determined location information received from location systems of the electronic device.

6. The method of claim 1 where the first location data comprises latitude, longitude, a timestamp, and an uncertainty metric.

7. The method of claim 1, where determining whether the first data meets a threshold of location data integrity includes determining whether the first data indicates that, between the first time and the second time, the device has traveled an expected distance.

8. The method of claim 7, where the expected distance is determined based on a classification of activity engaged in by a user of the device.

9. The method of claim 1, comprising discarding the first data if the first data is determined to not meet the threshold of location data integrity.

10. The method of claim 1, comprising adjusting an uncertainty metric associated with the first data if the first data is determined to not meet the threshold of location data integrity.

11. A computer program product stored on a non-transitory storage device and configured to cause an electronic device to perform operations comprising:
receiving, from a first location system of the electronic device, first data indicative of a first location of the device at a first time;
comparing the first data to second data indicative of a second location of the device at a second time, the second data having been received from a second location system of the electronic device, wherein comparing includes determining a difference between a value of the first data indicative of the first location and a value of the second data indicative of the second location;
based on the comparison, determining whether the first data meets a threshold of location data integrity, wherein determining whether the first data meets a threshold of location data integrity includes determining whether the difference meets a threshold expected deviation; and
in response to the determination whether the first data meets a threshold of location data integrity, determining whether to discard either of the first data or the second data, and determining whether to store either of the first data or the second data in a buffer of location data.

12. The computer program product of claim 11 where the expected deviation is determined based on a classification of activity engaged in by a user of the device.

13. The computer program product of claim 12 where the expected deviation is determined based on a maximum speed value associated with the activity engaged in by the user of the device.

14. The computer program product of claim 11 where the expected deviation is determined based on a current expected uncertainty metric provided by the first location system.

15. The computer program product of claim 11, the operations comprising receiving the second data from a buffer containing recently determined location information received from location systems of the electronic device.

16. The computer program product of claim 11 where the first location data comprises latitude, longitude, a timestamp, and an uncertainty metric.

17. The computer program product of claim 11, where determining whether the first data meets a threshold of location data integrity includes determining whether the first data indicates that, between the first time and the second time, the device has traveled an expected distance.

18. The computer program product of claim 17, where the expected distance is determined based on a classification of activity engaged in by a user of the device.

19. The computer program product of claim 11, comprising discarding the first data if the first data is determined to not meet the threshold of location data integrity.

20. The computer program product of claim 11, comprising adjusting an uncertainty metric associated with the first data if the first data is determined to not meet the threshold of location data integrity.

21. An electronic device comprising:
a first location system configured to determine a current location of the electronic device;
a second location system configured to determine a current location of the electronic device; and
one or more processors configured for:
receiving, from the first location system of the electronic device, first data indicative of a first location of the device at a first time;
comparing the first data to second data indicative of a second location of the device at a second time, the second data having been received from the second location system of the electronic device, wherein comparing includes determining a difference between a value of the first data indicative of the first location and a value of the second data indicative of the second location;
based on the comparison, determining whether the first data meets a threshold of location data integrity, wherein determining whether the first data meets a threshold of location data integrity includes determining whether the difference meets a threshold expected deviation; and
in response to the determination whether the first data meets a threshold of location data integrity, determining whether to discard either of the first data or the second data, and determining whether to store either of the first data or the second data in a buffer of location data.

22. The electronic device of claim 21, wherein the buffer comprises a memory storing at least one element of data representing a current location of the electronic device.

23. The electronic device of claim 21, the processor configured for determining a current location of the electronic device based on at least two elements of location data stored in the buffer.

24. The electronic device of claim 21, wherein the location data of the buffer comprises elements of location data, at least one of the elements of location data comprising data representing latitude/longitude data, a timestamp, and an uncertainty metric.

25. The electronic device of claim 21, the processor configured for determining whether to modify either of the first data or the second data before storage in the buffer.

26. The electronic device of claim 21, wherein the buffer stores data from at least two location systems, wherein the at least two location systems include two of a global navigation satellite system receiver, a cellular network-based positioning system, a wireless network positioning system, and a short-range positioning system.

27. A method comprising:
on an electronic device:
receiving a first element of location data from a first location system of the electronic device;
receiving other elements of location data from data storage of the electronic device, the other elements of location data having been provided by one or more other location systems of the electronic device;
comparing the first element of location data to the other elements of location data;
based on the comparison, determining that the difference between the first element of location data and at least one other element of location data represents a distance that is greater than an expected distance, wherein the expected distance is based at least in part on respective timestamps and respective uncertainty values of the elements of location data;
based on the comparison, determining that the at least one other element of location data is at least one of less accurate and less precise than the first element of location data;
storing the first element of location data in the data storage; and
removing the at least one other element of location data from the data storage.

28. The method of claim 27 wherein the expected distance is determined based on a classification of activity engaged in by a user of the device.

29. The method of claim 28 wherein the expected distance is determined based on a maximum speed value associated with the activity engaged in by the user of the device.

30. The method of claim 27, comprising adjusting an uncertainty value associated with at least one of the other elements of location data.

31. The method of claim 27 wherein at least one of the other elements of location data was provided by a second location system of the electronic device and at least another of the other elements of location data was provided by a third location system of the electronic device.

32. A computer program product stored on a non-transitory storage device and configured to cause an electronic device to perform operations comprising:
receiving a first element of location data from a first location system of the electronic device;
receiving other elements of location data from data storage of the electronic device, the other elements of location data having been provided by one or more other location systems of the electronic device;
comparing the first element of location data to the other elements of location data;
based on the comparison, determining that the difference between the first element of location data and at least one other element of location data represents a distance that is greater than an expected distance, wherein the expected distance is based at least in part on respective timestamps and respective uncertainty values of the elements of location data;
based on the comparison, determining that the at least one other element of location data is at least one of less accurate and less precise than the first element of location data;
storing the first element of location data in the data storage; and
removing the at least one other element of location data from the data storage.

33. The computer program product of claim 32 wherein the expected distance is determined based on a classification of activity engaged in by a user of the device.

34. The computer program product of claim 33 wherein the expected distance is determined based on a maximum speed value associated with the activity engaged in by the user of the device.

35. The computer program product of claim 32, the operations comprising adjusting an uncertainty value associated with at least one of the other elements of location data.

36. The computer program product of claim 32 wherein at least one of the other elements of location data was provided by a second location system of the electronic device and at least another of the other elements of location data was provided by a third location system of the electronic device.

37. An electronic device comprising:
a first location system;
data storage; and
one or more processors configured for:
receiving a first element of location data from the first location system;
receiving other elements of location data from the data storage, the other elements of location data having been provided by one or more other location systems of the electronic device;
comparing the first element of location data to the other elements of location data;
based on the comparison, determining that the difference between the first element of location data and at least one other element of location data represents a distance that is greater than an expected distance, wherein the expected distance is based at least in part on respective timestamps and respective uncertainty values of the elements of location data;
based on the comparison, determining that the at least one other element of location data is at least one of less accurate and less precise than the first element of location data;
storing the first element of location data in the data storage; and
removing the at least one other element of location data from the data storage.

38. The electronic device of claim 37 wherein the expected distance is determined based on a classification of activity engaged in by a user of the device.

39. The electronic device of claim 38 wherein the expected distance is determined based on a maximum speed value associated with the activity engaged in by the user of the device.

40. The electronic device of claim 37, the operations comprising adjusting an uncertainty value associated with at least one of the other elements of location data.

41. The electronic device of claim 37 wherein at least one of the other elements of location data was provided by a second location system of the electronic device and at least another of the other elements of location data was provided by a third location system of the electronic device.

* * * * *